United States Patent
Clasen et al.

(10) Patent No.: US 7,144,834 B2
(45) Date of Patent: Dec. 5, 2006

(54) OPTICAL COLORED GLASS, ITS USE, AND AN OPTICAL LONG-PASS CUTOFF FILTER

(75) Inventors: Rolf Clasen, Saarbrücken (DE); Monika Gierke, Wiesbaden-Erbenheim (DE); Jochen Freund, Mainz (DE); Magdalena Winkler-Trudewig, Mainz (DE); Uwe Kolberg, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/224,075

(22) Filed: Aug. 20, 2002

(65) Prior Publication Data

US 2003/0153451 A1    Aug. 14, 2003

(30) Foreign Application Priority Data

Aug. 22, 2001    (DE)   ............... 101 41 105

(51) Int. Cl.
*C03C 3/115*    (2006.01)
*C03C 3/089*    (2006.01)
*C03C 3/066*    (2006.01)

(52) U.S. Cl. ............ 501/58; 501/65; 501/67; 501/79; 501/56; 501/57

(58) Field of Classification Search ............ 501/56–58, 501/65, 72, 73, 77, 79, 900
See application file for complete search history.

(56) References Cited

U.S. PATENT DOCUMENTS

| | | | |
|---|---|---|---|
| 2,416,392 A | 2/1947 | Hood | |
| 2,688,560 A | 9/1954 | Armistead | |
| 2,688,561 A | 9/1954 | Armistead | |
| 3,527,649 A * | 9/1970 | Sullivan | 501/17 |
| 3,754,816 A * | 8/1973 | Ritze | 359/885 |
| 3,773,530 A * | 11/1973 | Morgan | 501/63 |
| 3,912,481 A * | 10/1975 | Bartholomew et al. | 65/30.12 |
| 3,954,485 A | 5/1976 | Seward, III et al. | |
| 4,106,946 A * | 8/1978 | Ritze | 501/55 |
| 5,059,561 A * | 10/1991 | Ciolek et al. | 501/13 |

FOREIGN PATENT DOCUMENTS

| | | |
|---|---|---|
| DE | 55123 | 6/1967 |
| DE | 1 596 844 | 10/1970 |
| DE | 1 303 171 | 11/1971 |
| DE | 14 13 87 | 4/1980 |
| JP | 43-19402 | 8/1968 |
| JP | 44-23823 | 10/1969 |
| JP | 50-11924 | 5/1975 |
| JP | 56-5348 | 1/1981 |
| RU | 1669881 | 8/1991 |
| SU | 192 373 | 4/1967 |

OTHER PUBLICATIONS (*) = Russian patent document together with English language abstract.

* cited by examiner

*Primary Examiner*—Karl Group
*Assistant Examiner*—Elizabeth A. Bolden
(74) *Attorney, Agent, or Firm*—Baker & Daniels

(57) ABSTRACT

The invention concerns an optical colored glass with a composition (in percent by weight based on oxide) of $SiO_2$ 30–75; $K_2O$ 5–35; $B_2O_3$ >4–17; ZnO 5–37; F 0.01–10; CdO 0.1–1, S+Se+Te 0.1–1.5 as well as the use of this glass as a long-pass cutoff filter.

22 Claims, 1 Drawing Sheet

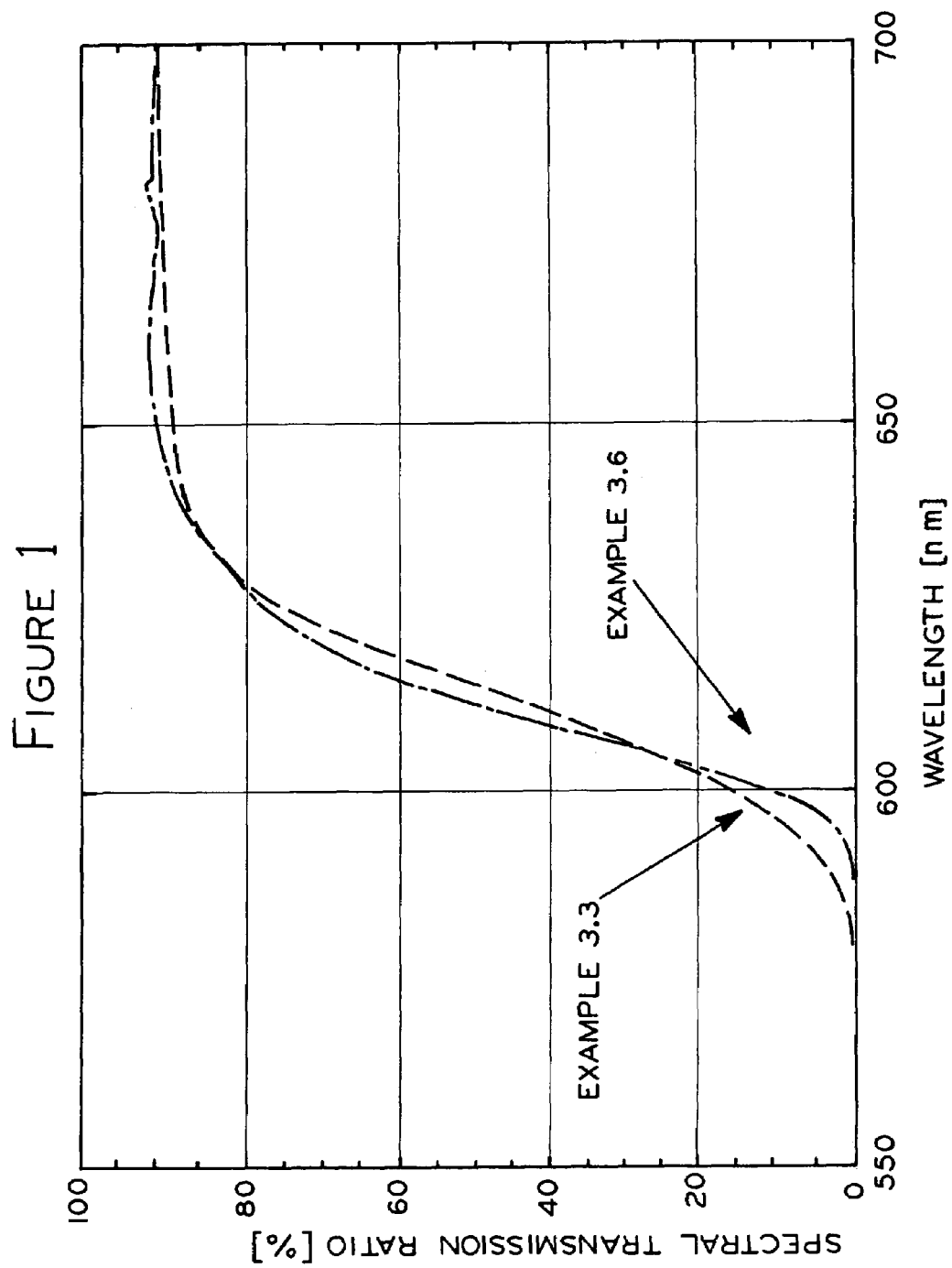

OPTICAL COLORED GLASS, ITS USE, AND AN OPTICAL LONG-PASS CUTOFF FILTER

The subject matter of the invention is an optical colored glass, it use, as well as an optical long-pass cutoff filter.

Optical long-pass cutoff filters are distinguished by characteristic transmission properties. In the short-wave range, cutoff filters with long-pass characteristics have a lower transmission, which increases to a higher transmission over a narrow spectral range and remains high in the long-wave range. The lower transmission range is called the stop band, and the higher transmission range is called the pass band or the transmission band.

Optical long-pass cutoff filters are characterized by certain parameters. For example, the absorption edge of such a filter is generally given as the so-called edge wavelength $\lambda_c$. It corresponds to the wavelength at which the spectral internal transmission factor between the stop band and the transmission band equals half of the maximum value.

Optical long-pass cutoff filters are generally made of colored glass, in which the coloring is caused by the precipitation of, for example, cadmium sulfide, cadmium selenide, and/or cadmium telluride during the cooling of the melt or by the later heat treatment. This is also sometimes called starting glass.

In patent literature, different glass compositions have already been described to be generally suitable for use as starting glass.

JP 50-11924 B describes $Li_2O$-containing and highly BaO-containing glass that contains CdS, Se, and Te.

The glass in U.S. Pat. No. 2,416,392 needs CoO in addition to CdS, while the glass in JP 44-23821 A needs iron oxide in addition to CdS.

The glass in SU 192373 contains PbO and $Cu_2O$ in addition to CdO, Se, S, and C. However, with the simultaneous presence of PbO and the chalcogenides, this leads to highly undesired discolorations in the glass.

F-free starting glass with CdS doping is described in different documents, e.g., DE-AS 1 596 844, JP 43-19402 A, DD 55123, and JP 44-23823 A. Such glass has a high melting point. This means the increased evaporation of individual components, especially chromophore substances, which is undesirable above all due to its toxicological properties.

From JP 56-5348 A, $SiO_2$-poor as well as F-free starting glass is known, the lower $SiO_2$ content of which has a disadvantageous effect on the chemical resistance, the thermal expansion factor, and the transformation temperature.

From U.S. Pat. No. 3,954,485, ZnO-free starting glass is known. However, this oxide is essential for the phase separation causing the start-up process.

The glass in U.S. Pat. Nos. 2,688,561, 2,688,560, DD 14 13 87, and DE 13 03 171 B does contain Cd, but contains neither Se, S, nor Te, whereby the desired coloring is not achieved by the semiconductor doping.

The purpose of the invention is to make available a transparent optical colored glass, which possesses long-pass cutoff filter properties, in particular an absorption edge between 390 and 850 nm. It is also the purpose of the invention to make such a long-pass cutoff filter available.

The purposes are fulfilled through an optical colored glass, the use of this glass, and a long-pass cutoff filter in accordance with the present invention.

With 30 to 75 percent by weight, preferably 40 to 65 percent by weight, $SiO_2$ is the main component of the glass.

In contrast to the common commercially available starting glass that is boron-free or, with 1–4 percent by weight of $B_2O_3$, boron-poor, the glass as per the invention contains between >4 and 17 percent by weight of $B_2O_3$. The sinter temperature is thus lowered, and the dissolution of the other glass components in the glass matrix is achieved, and, during production via a sintering process, the processability and drying of the green body is improved. Contents of at least 5 percent by weight are preferred; at least >6 percent by weight is particularly preferred. Amounts higher than 16 percent by weight would have a disadvantageous affect on the glass quality. Moreover, the solubility of $H_3BO_3$, a possible raw material for the boroxide, in an alcohol solution that is aqueous due to a high $K_2O$ content, is limited to the named $B_2O_3$ content.

The $H_3BO_3$ raw material is particularly advantageous when $K_2O$ is brought in as a component of the glass via the KOH raw material, since the very high pH value of the suspension, which has an effect on its viscosity and aggressively affects the mixing equipment, caused by the KOH, is lowered.

ZnO is an important component. This oxide is present at 5 to 37 percent by weight. The crystallization of the dopant is attained in homogenously distributed areas of the glass. Thus, a homogenous crystallite growth of the semiconductor doping is ensured by the tempering of the glass, and crystallites with a very narrow size distribution form. The very pure and bright color and the sharp absorption edge of the glass are the result of these monodispersive crystallites. The named upper limit of ZnO is meaningful, since glass that has a higher content of ZnO has a tendency to form drop-like areas of precipitation. A ZnO share of 5 to 30 percent by weight is preferred, particularly preferred from 15 to 23 percent weight. The segregation tendency of this type of "zinc silicate glass" can be lowered by the use of the $K_2O$ network converter. Thus, the glass contains 5 to 35 percent by weight, preferably 15 to 29 percent by weight, in order to prevent micro-precipitation of ZnO-enriched areas and to reduce their processing temperature. In particular, with a ZnO content >5 percent by weight, a $K_2O$ content >5 percent by weight is preferred, and, with a ZnO content >10 percent by weight, a $K_2O$ content >17 percent by weight is preferred. Highly transparent glass is obtained in this manner.

Moreover, the glass also contains between 0.01 and 10 percent by weight of F. This is especially advantageous if the glass is produced via sintering processes, since the sinter temperature is reduced by the F shares and the strength of the green bodies is increased. With production via a melting process, the presence of F reduces the melting temperature and evaporation of the colorant from the melt is reduced; this is especially advantageous with respect to the cadmium compounds used. At least 0.3 percent by weight of F is preferred.

The good strength of the green body is significant for its processing, its transport, and its handling. The strength of the green bodies is determined in that hydrogen bonds form between the neighboring SiOH groups and thus interlace the green bodies. When F is present, bonds also form between —SiF and —SiOH that are stronger than the aforementioned bonds and thus already increase the strength even when small amounts of F are present. The drying properties are impaired too much when the F content is too high (>10 percent by weight). Moreover, the thermal expansion factor becomes too high and the transformation temperature, too low. F contents <5 percent by weight are preferred.

As doping agents for coloring, the glass contains 0.1–1 percent by weight of CdO and 0.1 to 1.5 percent by weight of S+Se+Te. From Cd as the cationic components and S, Se, Te as the anionic components, mixed crystals form in situ from CdS/CdSe/CdTe, depending on the proportion of ingredients of the added components and the selected reaction conditions, which are easily determined by an expert.

Zn can also be installed in this crystal, especially if it is added as raw material ZnS and little "Cd" is present. The forming crystals can thus be described as (Cd, Zn), (S, Se, Te), whereby the components separated by commas can substitute each other in broad ranges or completely. By varying the content of each chalcogenide, the absorption edge in the range between 390 and 850 nm can be shifted.

Moreover, the glass can contain up to 20 percent by weight of $Na_2O$; up to 20 percent by weight, preferably up to 10 percent by weight, of MgO; up to 20 percent by weight, preferably up to 10 percent by weight, of CaO; and up to 10 percent by weight of $Al_2O_3$. $Na_2O$ serves the same purpose as $K_2O$. It can partially or completely substitute this, meaning that the total of $K_2O$ and $Na_2O$ should not exceed 35 percent by weight, and preferably not exceed 29 percent by weight. The chemical resistance would decrease at higher concentrations of $Na_2O$, and the expansion factor would be too high and the transformation temperature, too low. The other (expensive) alkaline oxides $Li_2O$, $Rb_2O$, $Cs_2O$ are also conceivable in principle, despite their price disadvantage. With the amount conceivable as a substitute for $K_2O$ (or $Na_2O$) (provided in percent by weight), the different mol measurements of this oxide are to be taken into consideration. The total of MgO and CaO should not exceed 20 percent by weight. The chemical resistance is improved by MgO and CaO. There are also price advantages. However, it should be noted that, when using larger amounts of CaO in particular, preferably only a small amount of F should be used, since $MF_2$-type (M=(MG), Ca, Sr, Ba) crystals otherwise form. With amounts larger than 10 percent by weight of MgO or CaO, there is also the danger of the crystallization of compounds other than $MF_2$ as well as an uneven and uncontrollable precipitation behavior so that the especially preferred range for MgO as well as CaO is <10 percent by weight. $Al_2O_3$ serves to improve chemical resistance. However, with larger amounts, the sinter/melting temperature increases greatly. It is preferred not to use more than 5 percent by weight.

Furthermore, the glass can contain up to <10 percent by weight of SrO and up to <10 percent by weight of BaO for fine-tuning of the expansion factor, the transformation temperature Tg, and the processing temperature $V_A$. It should also be noted here that these oxides should preferably not be used with large amounts of F in order to prevent the aforementioned crystallization of $MF_2$. Moreover, SrO and BaO are more expensive than the somewhat-similar MgO and CaO and are thus used in a more limited fashion. Shares <5 percent by weight are preferred. It is particularly preferred that, in glass in which the F content is between 1 and 10 percent by weight, the content of alkaline earth oxides (MgO+CaO+SrO+BaO) is limited to <3 percent by weight, preferably to $\leq 1$ percent by weight, or that the glass is free of alkaline earth oxides, and that, in glass in which the content of MgO+CaO+SrO+BaO is $\geq 3$ percent by weight, the content of F is limited to <1 percent by weight. Preferably, the content of F already in glass, in which the alkaline earth oxide content is >1 percent by weight, is limited to <1 percent by weight.

Furthermore, the glass can contain up to 5 percent by weight of $La_2O_3$, up to 5 percent by weight of $Nb_2O_5$, up to 5 percent by weight of $Ta_2O_5$, up to 5 percent by weight of $CeO_2$, up to 5 percent by weight of $ZrO_2$, and up to 10 percent by weight of $P_2O_5$. $P_2O_5$ improves the meltability/sinterability. But, since it has a negative effect on the expansion factor and the chemical resistance, it should only be used up to 5 percent by weight, preferably only to 3 percent by weight. Refractory oxides, i.e., oxides with a high melting point and/or good chemical resistance against the glass melt, like $ZrO_2$, $Nb_2O_5$, $Ta_2O_5$, and $La_2O_3$, can be used to improve the chemical resistance and to influence the expansion factor, Tg and $V_A$. Based on their poor meltability/sinterability and their high price, they are only used up to 5 percent by weight, preferably up to 3 percent by weight. $CeO_2$ also allows the improvement of the stop band for light (yellow) glass.

Further, common purification substances can be used in common amounts.

Purification substances include all components that give off or evaporate gas in the temperature range, given by the process, through redox reactions. Purification substances that, in addition to the purification effect, have a positive influence on the coloration as a result of the intervention in the redox process are preferred. Redox aids are, e.g., $As_2O_3$, $Sb_2O_3$, $As_2S_3$, and $Sb_2S_3$.

The glass can be melted using the common melting process for starting glass, i.e., under neutral or weak reducing conditions.

For coloration, the glass must undergo a start-up process, since directly after the cool-down from the production temperature (melting or sintering), it is colorless or only weakly or insufficiently colored. For this, they undergo an additional temperature treatment in the range $Tg+\leq 200°$ C. for several hours to days. During this treatment, microcrystallites made of Cd (S, Se, Te) form from the color components dissolved in the glass. The band gap between the valence band and the conduction band is determined, on one hand, by the composition of the crystallite and, on the other hand, by its size. This is then dependant on the start-up temperature and start-up time. The higher the temperature, the longer the start-up time, the larger the crystallites, the smaller the band gap, and the more long-wave (=red) the inherent color of the glass. The band gap thereby approaches asymptomatically the limit value of the macroscopic crystal of the same composition. After the start-up process has ended, the transmission behavior typical for the glass, namely that of a cutoff filter with long-pass characteristics, is developed. It is characterized by a stop band (underground) at short wavelengths and a very abrupt transition to practically complete transmission, the so-called pass or transmission band at somewhat higher wavelengths. In general, there are only about 100 nm between the stop and pass band. The wavelength, at which the transmission reaches 50% of the transmission in the pass band, is called the edge wavelength λc and characterizes the color of the glass.

Advantageously, the glass can also be produced with the help of a sintering process, i.e., based on a powder-technological method:

With this method, a green body consisting of a powdered $SiO_2$ suspension is created that can be sintered. For temperature reduction of the sintering process and for the matching of the glass properties to the dopant, other additives are used in addition to the powdered $SiO_2$, whereby, however, no alcohol solvents and, for the oxides, no organic, combustible, or toxic starting substances, are necessary.

Soluble raw materials or raw materials with a particle size <0.5 μm should be used as raw materials. In particular, the glass creator should be used as nano-scale powder. Nano-scale powder is to be understood as a raw material with a $d_{50}$ value for the average core size distribution that lies in the lower nm range, i.e., up to approx. 100 nm. For example, the powdered $SiO_2$ raw material has a $d_{50}$ value. Besides this powdered $SiO_2$ raw material, $SiO_2$ suspensions are also suitable as the raw material. Boric acid, zinc oxide, calcium carbonate, caustic potash solution, and other compounds that have network properties are used as raw materials for the additives. But, the additives can also be any other type of carbonate, caustic solution, or bases like soda lye or potassium hydrogen fluoride. It is irrelevant whether the raw materials are added to the suspension individually or whether two or more of these raw materials are already added as a prefabricated physical or chemical multi-component mixed phase. Moreover, dispersion aids like ammonium fluoride, other caustic solutions, and acids like sulfuric acid or phosphoric acid can also be added. Since these chemicals are generally also offered as standards in analytical purity, with the help of this procedure, highly pure glass can be obtained, whereby the level of purity of the glass depends on the pollutants in the additional glass components.

The green body is produced by dispersing and dissolving the source materials in any order in water or, optionally, in an alcohol solvent like ethanol.

In this process, one or more dopants MX with M=Cd and X=S, Se, Te, e.g., CdS, CdSe, but also mixed crystals like CdSSe are dispersed or dissolved together with the source materials.

In place of the use of CdS, CdSE, or CdTe, in situ creation of dopants from the elements, e.g., $Cd+Te \rightarrow CdTe$, or from other materials, e.g., CdO, $Na_2SeO_3$, and reducing gases is possible. However, to support these reactions, the appropriate temperature, time, and $pO_2$ conditions must be selected that can conflict with the conditions for the main reaction, so that this method is often not advisable despite the reasonable raw material costs.

The dissolving and dispersing of the source materials and eventually the dopants advantageously take place to produce a green body such that a pourable or spreadable suspension forms. The suspension is preferably poured into a casting mould.

After the hardening of the suspension at room temperature or temperatures below 130° C., the green body is dried at room temperature or at temperatures up to 400° C. The dried green body will finally be sintered or melted at temperatures between 600° C. and 1200° C., preferably 700° C. to 1000° C., depending on the glass composition. An expert knows to vary and, if necessary, alter the basic conditions given here for temperatures and variations in time for each specific case.

Optionally, in order to improve the homogeneity and the final quality of the resulting glass, the green body can once again be ground or ground, then dispersed and dried.

In the below examples, KOH, $H_3BO_3$, ZnO, $KHF_2$, $SiO_2$ are used as source materials, and CdS or CdSe are used as the dopants.

The source materials KOH, $H_3BO_3$, ZnO, $KHF_2$, CdS or CdSe as well as $SiO_2$ are successively dissolved or dispersed in water by stirring. Optionally, the stirring in of the raw materials can also take place with the aid of ultrasound or with the use of additives to the suspension, in order to ease the dispersing or dissolving of the different raw materials.

The finished suspension is poured into a casting mould, in which it hardens, and air-dries for 10–96 hours. It can also be painted or extruded into the casting mould. After removal from the mould, the green body is dried at room temperature for another 10 to 96 hours and subsequently 1 to 48 hours at 40 to 400° C.

The sintering to the transparent glass occurs at temperatures between 600 and 1200° C., depending on the composition of the glass. Holding times generally range between 10 minutes and 5 hours. The later start-up process for the formation of the CdS or CdSe crystallite is performed at 400 to 700° C., whereby holding times between 5 and 500 hours are used.

Glass produced based on the two-step procedure with the help of a sintering process can be produced at temperatures that lie approx. 200 to 700° C. below the production temperature of the glass using a pure melting process. This means an energy savings during the production process, a much lower emission of the toxic dopants CdS, CdSe, and CdTe, a lower chemical attack of the melting aggregate due to the aggressive composition of the glass, and the reduction of toxic dopants. Through the sinterability of the green body using the two-step procedure, it is also possible to perform the shaping process of the finished glass product at room temperature close to the stop measure, whereby the losses for touch ups, e.g., sawing, cutting, polishing, are greatly reduced. This procedure is particularly environmentally friendly due to the option of using standard chemicals from the chemical industry and the glass industry to produce the green body and letting the forming process take place based on water.

The final compositions of the different types of glass produced based on the described sintering process as well as their sinter temperatures are given in Table 1.

TABLE 1

Compositions and sinter temperatures of colored glass with CdS doping produced according to the described sintering procedure

| Example | | 1.1 | 1.2 | 1.3 | 1.4 | 1.5 | 1.6 |
|---|---|---|---|---|---|---|---|
| Composition (% by weight) | SiO | 65.25 | 56.39 | 41.23 | 38.35 | 40.34 | 41.21 |
| | $K_2O$ | 16.36 | 16.96 | 25.19 | 27.27 | 23.50 | 25.43 |
| | $B_2O_3$ | 7.31 | 15.16 | 15.39 | 14.32 | 11.79 | 9.81 |
| | ZnO | 10.87 | 11.28 | 11.45 | 10.65 | 15.78 | 16.48 |
| | F | 0.21 | 0.22 | 6.73 | 9.40 | 8.59 | 7.08 |
| | CdS | 0.73 | 0.71 | 0.50 | 0.49 | 0.49 | 0.52 |
| Sinter Temp. [° C.] | | 900 | 850 | 700 | 650 | 650 | 700 |

The amount of the dopant is added to the base glass.

In Table 2, the same glass is represented as in Table 1, with the exception that the doping here is CdSe. The same base glass is indicated with the same numbers. Note that the amount of the doping depends on the dopant. Its sinter temperatures correspond to those named in Table 1 and are thus not given in Table 2.

In order to improve the quality of the glass, in particular with respect to minimizing the number of bubbles, it can be advantageous to heat the glass not just to its sinter temperature, but to increase the temperature somewhat. This lowers the viscosity of the glass and remaining bubbles can escape from the glass body.

As opposed to Table 1, Table 2 provides the temperature at which the remaining bubbles escape from the glass in the given examples. This temperature, characterized by the escape of the bubbles, will be called the "refining temperature" in this announcement. Like the sinter temperature, it is identical for the named examples with CdS doping and CdSe doping. The small difference in the content of dopant causes almost no change in the temperatures.

The finished suspension is poured into any casting mould, in which it hardens, and air-dries for 24 hours. After removal from the mould, the green body is dried for another 48 hours at room temperature and subsequently for 24 hours at 120° C.

The sintering to the transparent glass occurs at 700° C. and a holding time of 1 hour. The later start-up process for the formation of the CdS crystallite is performed at 500° C. with a holding time of 10 hours.

Based on its transmission progression, the glass is excellently suited for use as an optical long-pass cutoff filter. In the stop band, the glass has a transmission of $<10^{-3}$ and better. The transmission of the glass is sufficiently high in the transmission band.

TABLE 2

Compositions and refining temperatures of colored glass with CdSe doping produced according to the described sintering procedure

| Example | | 2.1 | 2.2 | 2.3 | 2.4 | 2.5 | 2.6 |
|---|---|---|---|---|---|---|---|
| Composition (% by weight) | SiO | 65.25 | 56.39 | 41.23 | 38.35 | 40.34 | 41.21 |
| | K$_2$O | 16.36 | 16.96 | 25.19 | 27.27 | 23.50 | 25.43 |
| | B$_2$O$_3$ | 7.31 | 15.16 | 15.39 | 14.32 | 11.79 | 9.81 |
| | ZnO | 10.87 | 11.28 | 11.45 | 10.65 | 15.78 | 16.48 |
| | F | 0.21 | 0.22 | 6.73 | 9.40 | 8.59 | 7.08 |
| | CdSe | 0.59 | 0.57 | 0.39 | 0.36 | 0.38 | 0.39 |
| Refining Temp. [° C.] | | 1200 | 1150 | 950 | 870 | 890 | 950 |

The amount of the dopant is added to the base glass.

The glass is produced using a green body in both described procedures.

If the glass is heated to the described "refining temperature," then it is irrelevant for the procedure and the quality of the glass whether this "refining temperature" is reached in one step or whether the glass is first sintered vitreously at a lower sinter temperature and increased to this higher temperature in a second temperature step.

As the temperature values clearly show, the "refining temperature," in accordance with the definition in this announcement for the glass as per this invention, always lies below the production and processing temperatures of commonly produced glass.

The following is provided as an example for all other examples of the detailed process for the production of the green body to be sintered. The green body for example 1.6 is produced via a suspension of the following substances in 90 l of water and contains:

| Oxide | Percent by Weight | Raw Material | Weighted-In Quantity (kg) |
|---|---|---|---|
| SiO$_2$ | 41.21 | SiO$_2$ | 41.21 |
| K$_2$O | 25.43 | KOH | 22.67 |
| B$_2$O$_3$ | 9.81 | H$_3$BO$_3$ | 17.51 |
| ZnO | 16.48 | ZnO | 16.48 |
| F | 7.08 | KHF$_2$ | 14.42 |
| CdS | 0.52 | CdS | 0.52 |

The different raw materials KOH, H$_3$BO$_3$, ZnO, KHF$_2$, CdS, SiO$_2$ are successively dissolved and dispersed in water by stirring. This creates a pourable suspension that contains all of the components of the later transparent, colored, optical glass.

The absorption edge of the glass is sufficiently steep and, with doping with CdS, lies at approx. 500 nm, with doping with CdSe, at approx 700 nm; with the use of CdTe, edges of up to 850 nm can be realized. With "mixed dopings," corresponding interim edge positions can be achieved. If the molar ratio cadmium/chalcogenide is <1, the edge is shifted by approx. 100 nm into the short-wave range. This effect is particularly pronounced with sulfide. Thus, edge positions of up to 390 nm are achieved.

FIG. 1 shows the transmission progression (spectral transmission ratio vs. wavelength with a sample density of 3 mm) of two types of sintered glass with base compositions in accordance with examples x.3 and x.6 with a mixed doping of CdS and CdSe in the wavelength range from 550 nm to 700 nm, i.e., from 0.234 CdSe+0.200 CdS (example 3.3, reference number 1) and 0.234 CdSe+0.208 CdS (example 3.6, reference number 2) (also see Table 3).

TABLE 3

Compositions of colored glass with CdS and CdSe doping (composition in percent by weight) produced according to the described sintering procedure

| | 3.3 | 3.6 |
|---|---|---|
| SiO$_2$ | 41.23 | 41.21 |
| K$_2$O | 25.19 | 25.43 |
| B$_2$O$_3$ | 15.39 | 9.81 |
| ZnO | 11.45 | 16.48 |
| F | 6.73 | 7.08 |
| CdS | 0.200 | 0.208 |
| CdSe | 0.234 | 0.234 |

The amount of the dopant is added to the base glass.

What is claimed is:

1. An optical colored glass composition comprising: (in percent by weight based on oxide)

| | |
|---|---|
| $SiO_2$ | 30–75 |
| $K_2O$ | 5–35 |
| $B_2O_3$ | >4–17 |
| ZnO | 5–37 |
| F | at least 2.1 |
| CdO | 0.1–1 |
| S + Se + Te | 0.1–1.5. |

2. The optical colored glass composition of claim 1, comprising: (in percent by weight based on oxide)

| | |
|---|---|
| $SiO_2$ | 30–75 |
| $K_2O$ | 5–35 |
| $B_2O_3$ | >4–17 |
| ZnO | 5–37 |
| F | >6.73 |
| CdO | 0.1–1 |
| S + Se + Te | 0.1–1.5. |

3. An optical colored glass composition comprising: (in percent by weight based on oxide)

| | |
|---|---|
| $SiO_2$ | 30–75 |
| $K_2O$ | 5–35 |
| $B_2O_3$ | >4–17 |
| ZnO | 5–37 |
| F | at least 2.1 |
| CdO | 0.1–1 |
| S + Se + Te | 0.1–1.5; and |
| $Al_2O_3$ | 0. |

4. The optical colored glass composition of claim 3, further comprising common refining substances in common amounts.

5. The optical colored glass composition of claim 3, further comprising:

| | |
|---|---|
| F | at least 2.1; and |
| MgO + CaO + SrO + BaO | 0–<3. |

6. The optical colored glass composition of claim 3, comprising an absorption edge (=edge wavelength $\lambda_c$) between 390 nm and 850 nm.

7. An optical long pass cutoff filter comprising the optical glass of claim 3.

8. An optical long pass cutoff filter consisting of the optical glass of claim 3.

9. The optical colored glass composition of claim 3 comprising: (in percent by weight based on oxide)

| | |
|---|---|
| $SiO_2$ | 30–75 |
| $K_2O$ | 5–35 |
| $B_2O_3$ | >4–17 |
| ZnO | 5–30 |
| F | at least 2.1 |
| CdO | 0.1–1 |
| S + Se + Te | 0.1–1.5; and |
| $Al_2O_3$ | 0. |

10. The optical colored glass composition of claim 9 comprising: (in percent by weight based on oxide) of

| | |
|---|---|
| $SiO_2$ | 40–65 |
| $K_2O$ | 15–29 |
| $B_2O_3$ | 5–16 |
| ZnO | 9–30 |
| F | at least 2.1 |
| CdO | 0.1–1 |
| S + Se + Te | 0.1–1; and |
| $Al_2O_3$ | 0. |

11. The optical colored glass composition of claim 9 further comprising: (in percent by weight based on oxide)

| | |
|---|---|
| $Na_2O$ | 0–20 |
| MgO | 0–20 |
| CaO | 0–20 |
| with CaO + MgO | 0–20. |

12. The optical colored glass composition of claim 9 further comprising: (in percent by weight based on oxide)

| | |
|---|---|
| SrO | 0–<10 |
| BaO | 0–<10 |
| $La_2O_3$ | 0–5 |
| $Nb_2O_5$ | 0–5 |
| $Ta_2O_5$ | 0–5 |
| $CeO_2$ | 0–5 |
| $ZrO_2$ | 0–5 |
| $P_2O_5$ | 0–10. |

13. The optical colored glass composition of claim 2, further comprising an absorption edge (=edge wavelength $\lambda_c$) between 390 nm and 850 nm.

14. The optical colored glass composition of claim 3 comprising: (in percent by weight based on oxide)

| | |
|---|---|
| $SiO_2$ | 30–75 |
| $K_2O$ | 5–35 |
| $B_2O_3$ | >4–17 |
| ZnO | 5–30 |
| F | at least 2.1 |
| CdO | 0.1–1 |
| S + Se + Te | 0.1–1.5 |
| $Al_2O_3$ | 0. |

15. The optical colored glass composition of claim 14 further comprising: (in percent by weight based on oxide)

| | |
|---|---|
| $Na_2O$ | 0–20 |
| MgO | 0–20 |
| CaO | 0–20 |
| with CaO + MgO | 0–20. |

16. The optical colored glass composition of claim 14 further comprising: (in percent by weight based on oxide)

| | |
|---|---|
| SrO | 0–<10 |
| BaO | 0–<10 |
| La$_2$O$_3$ | 0–5 |
| Nb$_2$O$_5$ | 0–5 |
| Ta$_2$O$_5$ | 0–5 |
| CeO$_2$ | 0–5 |
| ZrO$_2$ | 0–5 |
| P$_2$O$_5$ | 0–10. |

17. The optical colored glass composition of claim 14, further comprising an absorption edge (=edge wavelength $\lambda_c$) between 390 nm and 850 nm.

18. The optical colored glass composition of claim 3, further comprising: (in percent by weight based on oxide)

| | |
|---|---|
| Na2O | 0–20 |
| MgO | 0–20 |
| CaO | 0–20 |
| with CaO + MgO | 0–20. |

19. The optical colored glass composition of claim 18, further comprising:

| | |
|---|---|
| MgO + CaO + SrO + BaO | ≧3; and |
| F | at least 2.1. |

20. The optical colored glass composition of claim 18 further comprising: (in percent by weight based on oxide)

| | |
|---|---|
| SrO | 0–<10 |
| BaO | 0–<10 |
| La$_2$O$_3$ | 0–5 |
| Nb$_2$O$_5$ | 0–5 |
| Ta$_2$O$_5$ | 0–5 |
| CeO$_2$ | 0–5 |
| ZrO$_2$ | 0–5 |
| P$_2$O$_5$ | 0–10. |

21. The optical colored glass composition of claim 3, further comprising: (in percent by weight based on oxide)

| | |
|---|---|
| SrO | 0–<10 |
| BaO | 0–<10 |
| La$_2$O$_3$ | 0–5 |
| Nb$_2$O$_5$ | 0–5 |
| Ta$_2$O$_5$ | 0–5 |
| CeO$_2$ | 0–5 |
| ZrO$_2$ | 0–5 |
| P$_2$O$_5$ | 0–10. |

22. The optical colored glass composition of claim 21 further comprising:

| | |
|---|---|
| MgO + CaO + SrO + BaO | ≧3; and |
| F | at least 2.1. |

* * * * *

UNITED STATES PATENT AND TRADEMARK OFFICE
CERTIFICATE OF CORRECTION

PATENT NO.         : 7,144,834 B2                                    Page 1 of 1
APPLICATION NO. : 10/224075
DATED               : December 5, 2006
INVENTOR(S)        : Rolf Clasen et al.

It is certified that error appears in the above-identified patent and that said Letters Patent is hereby corrected as shown below:

Claim 14, Column 10, Lines 50-56: delete entire claim and insert

--The optical colored glass composition of claim 3 comprising: (in percent by weight based on oxide)

| | |
|---|---|
| $SiO_2$ | 40-65 |
| $K_2O$ | 15-29 |
| $B_2O_3$ | 5-16 |
| ZnO | 9-30 |
| F | at least 2.1 |
| CdO | 0.1-1 |
| S+Se+Te | 0.1-1; and |
| $Al_2O_3$ | 0. -- |

Claim 18, Column 11, Line 21, delete "Na20" and insert -- $Na_2O$ --

Signed and Sealed this

Thirteenth Day of March, 2007

JON W. DUDAS
*Director of the United States Patent and Trademark Office*